United States Patent
Shvodian

(10) Patent No.: US 12,382,483 B2
(45) Date of Patent: *Aug. 5, 2025

(54) VARIABLE DOWNLINK CONFIGURATIONS FOR CO-LOCATED AND NON-CO-LOCATED BASE STATIONS

(71) Applicant: T-MOBILE INNOVATIONS LLC, Overland Park, KS (US)

(72) Inventor: William M. Shvodian, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/485,152

(22) Filed: Oct. 11, 2023

(65) Prior Publication Data

US 2024/0049271 A1 Feb. 8, 2024

Related U.S. Application Data

(63) Continuation of application No. 17/316,086, filed on May 10, 2021, now Pat. No. 11,825,500.

(51) Int. Cl.
*H04W 72/54* (2023.01)
*H04W 24/10* (2009.01)
*H04W 72/04* (2023.01)
*H04W 72/0453* (2023.01)
*H04W 72/23* (2023.01)
*H04W 72/541* (2023.01)

(52) U.S. Cl.
CPC ......... *H04W 72/541* (2023.01); *H04W 24/10* (2013.01); *H04W 72/0453* (2013.01); *H04W 72/23* (2023.01)

(58) Field of Classification Search
CPC ... H04W 72/541; H04W 72/23; H04W 24/10; H04W 72/0453
See application file for complete search history.

(56) References Cited

U.S. PATENT DOCUMENTS

| | | |
|---|---|---|
| 6,975,837 B1 * | 12/2005 | Santoru .............. H04B 7/1851 |
| 2006/0251041 A1 * | 11/2006 | Pajukoski ................ H04L 5/06 |
| 2010/0097963 A1 | 4/2010 | Astely et al. |
| 2011/0051711 A1 | 3/2011 | Kishiyama et al. |
| 2011/0319088 A1 | 12/2011 | Zhou et al. |
| 2014/0148122 A1 | 5/2014 | Meredith et al. |
| 2015/0110004 A1 | 4/2015 | Katz |

(Continued)

*Primary Examiner* — Ronald B Abelson
(74) *Attorney, Agent, or Firm* — Shook, Hardy & Bacon L.L.P.

(57) ABSTRACT

Methods and systems are provided for modifying a downlink configuration of a user device in a cell to mitigate interference. The methods and systems assign, via a first cell site, a first bandwidth to the user device within a serviceable area of the first cell site. The first bandwidth is blanked such that the user device receives data on a second bandwidth that is a smaller bandwidth than the first bandwidth. In addition, the methods and systems determine that the first bandwidth has at least one interference measurement above a threshold. Upon determining that the at least one interference measurement is above the threshold, the methods and systems modify the downlink configuration of the user device to a third bandwidth. The third bandwidth is a smaller bandwidth than the second bandwidth.

20 Claims, 9 Drawing Sheets

(56) References Cited

U.S. PATENT DOCUMENTS

2017/0303274 A1* 10/2017 He .................. H04W 72/23
2019/0349815 A1   11/2019 Tiirola et al.
2021/0410107 A1   12/2021 Park et al.
2022/0191894 A1    6/2022 Harada et al.

* cited by examiner

VARIABLE DOWNLINK CONFIGURATIONS FOR CO-LOCATED AND NON-CO-LOCATED BASE STATIONS

CROSS-REFERENCE TO RELATED APPLICATIONS

The present application is a continuation of U.S. patent application Ser. No. 17/316,086, filed May 10, 2021, titled "VARIABLE DOWNLINK CONFIGURATIONS FOR CO-LOCATED AND NON-CO-LOCATED BASE STATIONS." The entirety of the aforementioned applications are incorporated by reference herein.

SUMMARY

The present disclosure is directed, in part, to geographically modify a downlink configuration of a user device to mitigate interference. The present disclosure assigns, via a first cell site, a first bandwidth to the user device within a serviceable area of the first cell site. A portion of the first bandwidth is blanked such that the user device receives data on a second bandwidth that is a smaller bandwidth than the first bandwidth. In addition, methods, media, and systems of the present disclosure determine that the first bandwidth has at least one interference measurement above a threshold. The interference measurement corresponds to a second cell site. Upon determining that the at least one interference measurement is above the threshold, the methods and systems modify the downlink configuration of the user device to a third bandwidth. The third bandwidth is a smaller bandwidth than the second bandwidth.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
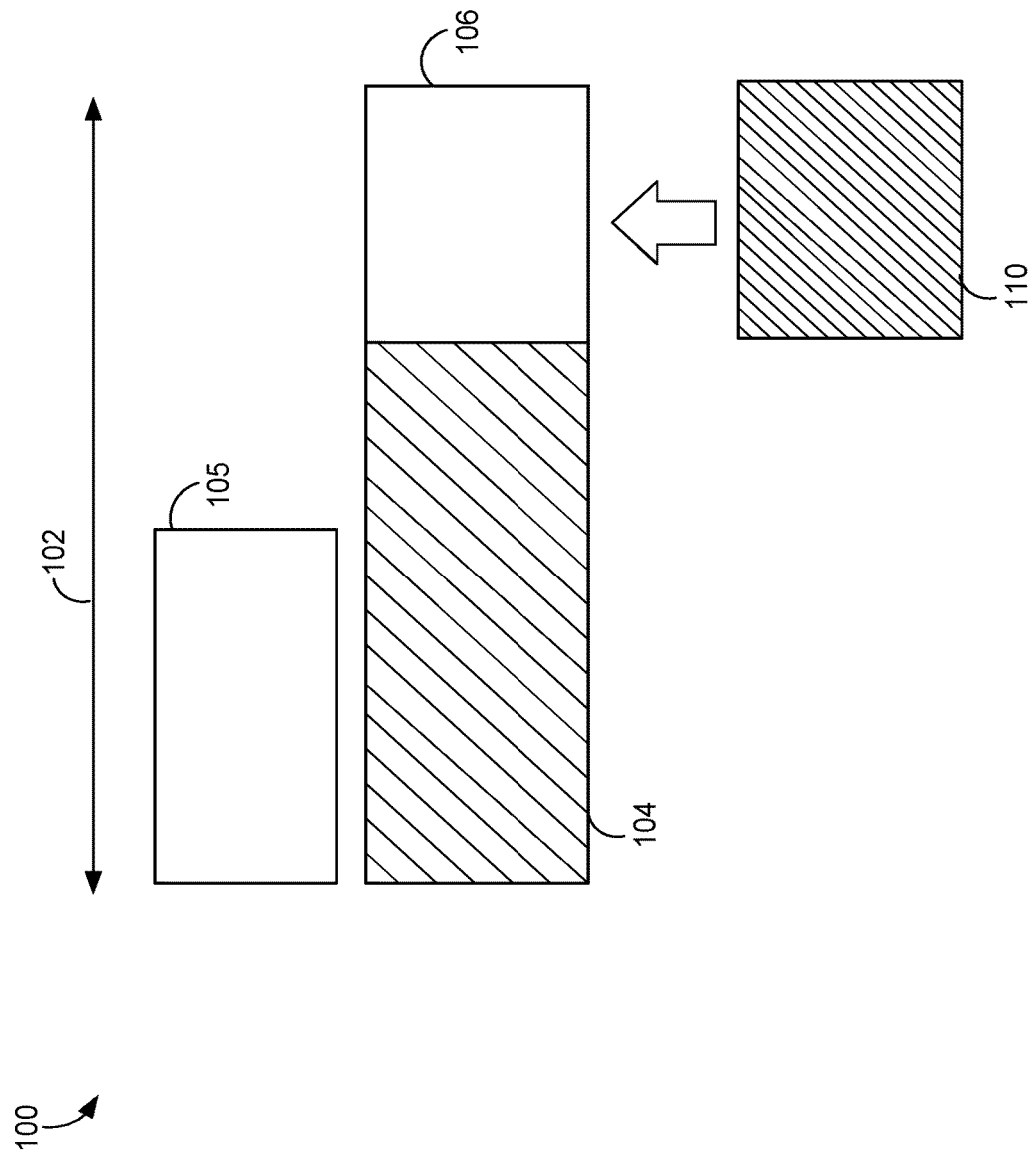
FIG. 1 depicts an example operator environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 4G | Fourth-Generation Cellular Communication System |
| 5G | Fifth-Generation Cellular Communication System |
| 3GPP | Third Generation Partnership Project |
| CD-ROM | Compact Disk Read Only Memory |
| CDMA | Code Division Multiple Access |
| GPRS | General Packet Radio Service |
| GSM | Global System for Mobile communications |
| DVD | Digital Versatile Discs |
| EEPROM | Electrically Erasable Programmable Read Only Memory |
| E-UTRA | Evolved Universal Terrestrial Radio Access |
| FDD | Frequency Division Duplexing |
| LTE | Long Term Evolution |
| NR | New Radio |
| OFDM | Orthogonal Frequency-Division Multiplexing |
| PC | Personal Computer |
| PDA | Personal Digital Assistant |
| RAM | Random Access Memory |
| RF | Radio-Frequency |
| Rx | Receive |
| TDD | Time Division Duplexing |
| TDMA | Time Division Multiple Access |
| Tx | Transmit |
| UTRA | Universal Terrestrial Radio Access |
| WiMAX | Wireless Inter-operability for Microwave |

Further, various technical terms are used throughout this description. An illustrative resource that fleshes out various aspects of these terms can be found in Newton's Telecom Dictionary, 31st Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, conventional telecommunications networks comprise network operators (i.e., wireless service providers, wireless carriers, network carriers, etc.) for assistance with delivering wireless communication services via spectrum allocation, backhauls, etc. To perform operations at a cell site, a particular operator will have access to a license permitting particular wireless communication services to end users. Some of the particular wireless communication services may involve licenses for 6 MHz or 7 MHz, for example. However, the wireless communication technology may not have explicit configurations for 3GPP for 5G NR having channels in multiples of 5 MHz, for example.

To achieve the goal of providing wireless communication services via a spectrum (e.g., the NR spectrum) without explicit configurations, conventional systems blindly configure user devices receiving the wireless communication services to a wider channel than the license permits. To comply with the license, the cell site will provide resource block blanking for certain communication signals. This blind configuration approach results in interferences. In addition, these blind configurations also fail to take into consideration these interferences when configuring downlink configurations for user devices. Accordingly, slower telecommunication services result from the blink configurations.

To illustrate, if an operator has a license for 7 MHz and would like to provide services via the NR spectrum, the operator could automatically use a wider channel. One problem with automatically using wider channels is that user devices communicating via the wider channel would be subject to interferences from an adjacent spectrum having resource blocks that have been blanked. For example, a near-far interference problem occurs based on a strong signal from a near signal source making it difficult for a receiver (e.g., a user device) to detect or properly demodulate the weaker signal from a further source (e.g., the cell site providing the communication services to the user device). The near-far interference problem may result due to adjacent-channel interference, co-channel interference, distortion, capture effect, blocking, dynamic range limitation, or the like.

The systems and methods disclosed herein can alleviate one or more of the problems discussed above. For instance, the systems and methods disclosed herein can configure downlink configurations of user devices. For cell sites experiencing interference from cell sites of an operator in an adjacent spectrum, a network can configure UEs to use the next narrower downlink channel bandwidth. To illustrate, if the operator's license is 6 MHz and the UEs are assigned a 10 MHz downlink with blanking, the UEs could be configured to use 5 MHz downlink upon a determination that the UE is experiencing interference.

In aspects, the methods disclosed herein can assign, via a first cell site, a first bandwidth to the user device within a serviceable area of the first cell site. A portion of the first bandwidth is blanked such that the user device receives data on a second bandwidth that is a smaller bandwidth than the first bandwidth. Further, it may be determined that the first bandwidth within the serviceable area of the first cell site has at least one interference measurement above a threshold. Upon determining that the at least one interference measurement is above the threshold, the downlink configuration of the user device may be modified to a third bandwidth that is a smaller bandwidth than the second bandwidth.

In another aspect, a system disclosed herein may modify a downlink configuration of the user device in a cell to mitigate interference. The system may comprise a first cell site having one or more nodes, each of the one or more nodes configured to wirelessly communicate with the user device in a serviceable area. Additionally, the systems has one or more processors in communication with the first cell site and configured to perform operations. For example, the operations comprise assigning, via the first cell site, a first bandwidth to the user device within the serviceable area. A portion of the first bandwidth is blanked such that the user device receives data on a second bandwidth that is a smaller bandwidth than the first bandwidth. The operations also comprise determining that the serviceable area has at least one interference measurement above a threshold. The at least one interference measurement corresponds to a second cell site. Accordingly, the downlink configuration of the user device is modified to a third bandwidth that is a smaller bandwidth than the second bandwidth.

In yet another aspect, one more non-transitory computer-readable media disclosed herein may modify a downlink configuration of the user device in a cell to mitigate interference. For example, the one more non-transitory computer-readable media may have computer-executable instructions embodied thereon that, when executed, perform a method. The method may comprise assigning, via a first cell site, a first bandwidth to the user device within a serviceable area. A portion of the first bandwidth is blanked such that the user device receives data on a second bandwidth that is a smaller bandwidth than the first bandwidth. Additionally, the method may comprise determining that the serviceable area has at least one interference measurement above a threshold, the at least one interference measurement corresponding to a second cell site. Upon determining that the at least one interference measurement above the threshold, the method may modify the downlink configuration of the user device to a third bandwidth that is a smaller bandwidth than the second bandwidth.

Turning now to FIG. 1, example operator environment 100 comprises first bandwidth 102, second bandwidth 104, third bandwidth 105, interference area 106, and blocker 110.

In some embodiments, a UE is assigned the first bandwidth 102. Continuing the example, the first bandwidth may be blanked such that the UE receives data on the second bandwidth 104 that is a smaller bandwidth than the first bandwidth 102. Beginning with the term "UE," "UE" and "user device" are used interchangeably throughout this disclosure to refer to a device employed by an end-user that communicates using a network. As used herein, UE can include any device employed by an end-user to communicate with a wireless telecommunications network. For example, a UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 800 described herein with respect to FIG. 8.

The UE may include a transceiver, which has a circuitry useful in both wirelessly receiving and/or wirelessly transmitting signals. As such, the UE comprises an Rx channel for receiving the signals. In some embodiments, Rx Channel may be combined with a Tx Channel into a single unit. For example, the transceiver may transmit and receive orthogonal frequency division multiplexing signals (e.g., data symbols) to support data communication in wireless applications. Examples of the wireless applications include Personal Area Network networks (e.g., Bluetooth), Wireless Local Area Networks (e.g., 802.11x Wi-Fi), Wide Area Networks (e.g., 3G, 4G, and LTE and LTE-LAA cellular networks), WiMAX, and so forth. The transceiver may also include mode selection circuitry, which enables dynamic selections of various modes of operation. For example, a processor may have the transceiver operate in TDD mode or FDD mode.

In some embodiments, UE Rx channel may support a 10 MHz channel, a 15 MHz channel, a 20 MHz channel, a 25 MHz channel, or a wider channel corresponding to a 5G NR radio access network. In addition, second bandwidth 104 is a smaller bandwidth than the first bandwidth 102. Further, first bandwidth 102 may include a channel bandwidth in which a corresponding operator of a cell site has a license for wireless telecommunications. Due to the licensed spectrum being smaller than first bandwidth 102, and due to the portion of the first bandwidth 102 being blanked such that the UE receives data on the second bandwidth 104 that is a narrower bandwidth than the first bandwidth 102, the blocker 110 may cause the interference area 106.

For example, blocker 110 may comprise a signal from another base station that is not co-located with the base station providing the first frequency band 102. Continuing the example, blanking the portion of the first bandwidth 102 for the UE to receive on the second bandwidth 104 complies with the license for providing wireless telecommunications. In one embodiment, the first bandwidth 102 is 10 MHz and the second bandwidth is 7 MHz. Continuing the example, blocker 110 results from a base station that is not co-located with the base station that is providing the 10 MHz channel, which results in interference area 106 due to unwanted emissions from the transmitter of the base station at blocker 110 degrading the receiver of the base station providing the 10 MHz channel.

Due to costs and various complexities of acquiring various sites for providing wireless telecommunication services to serviceable areas, may sites have multiple base stations that cover different frequency bands at the same site. The multiple base stations may belong to the same operator, or the multiple base stations may be shared among multiple operators. Additionally, different operators may have base stations operating in the same band on different carriers within the band and at the same site. To thwart unwanted emissions from a transmitter of a base station from degrading a receiver of one of the other multiple base stations, the multiple base stations are co-located—i.e., the multiple base stations comply with transmitter and receiver requirements.

For example, the requirements include specific unwanted emissions and receiver blocking requirements. In some embodiments, base stations that are closer in proximity than other base stations have stricter blocking requirements. Additionally, in some embodiments the requirements are specific to bandwidth. Further, the requirements may or may not be mandatory. Furthermore, requirements vary based on a class of the corresponding base station. In some embodiments, a transmitter intermodulation is one requirement.

Figure 2:
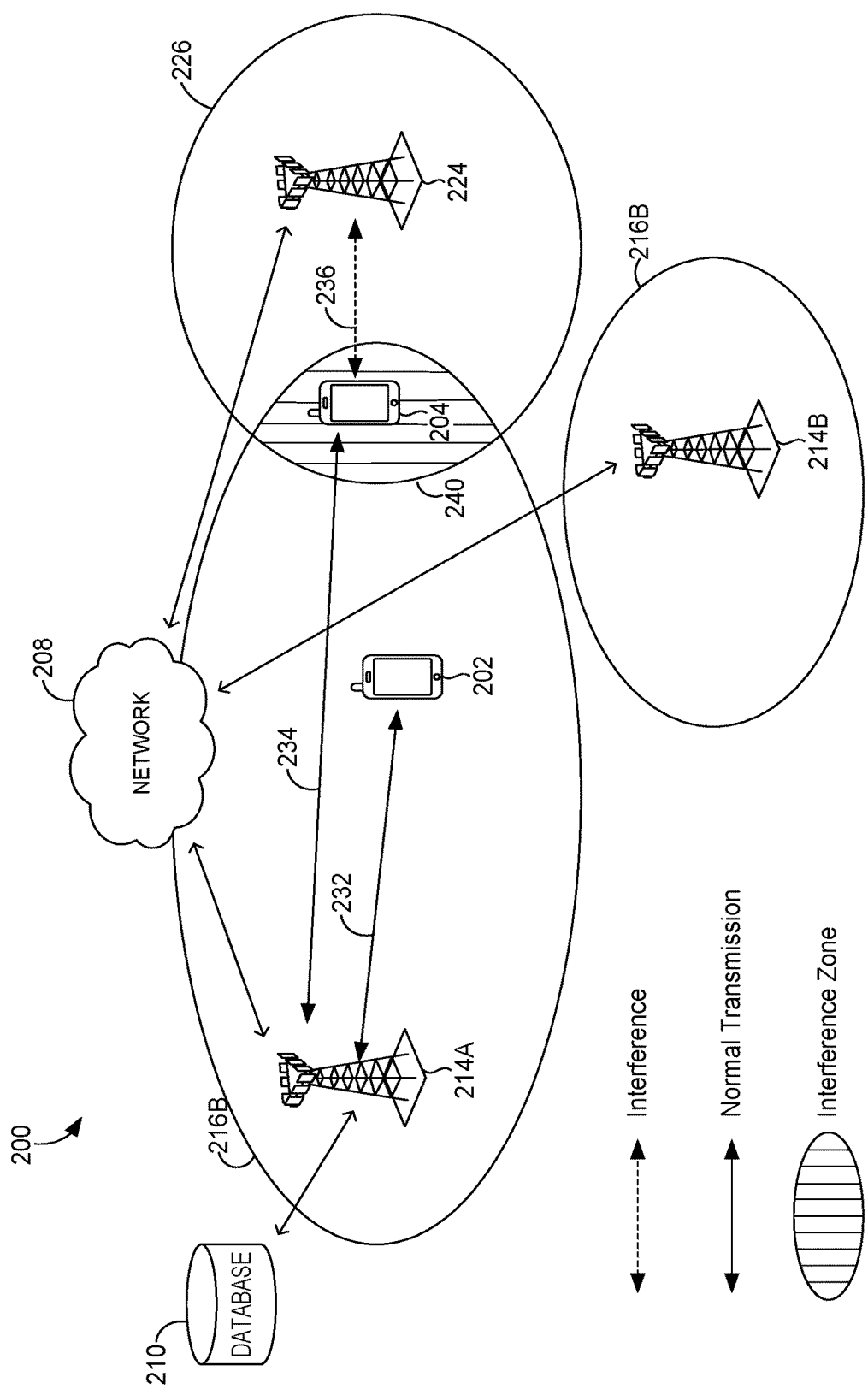
FIG. 2 depicts an example network environment comprising two cell sites, the network environment suitable for use in implementations of the present disclosure.

Turning now to FIG. 2, example network environment 200 comprises is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UEs 202 and 204 (e.g. user device 800 in FIG. 8), network 208, database 210, a first cell site 214A providing wireless communication services to serviceable area 216A, a second cell site 224 providing wireless communication services to serviceable area 226, a third cell site 214B providing wireless communication services to serviceable area 216B, normal transmissions 232 and 234, interference 236, and an interference zone 240. The first cell site 214A and the third cell site 214B have the same operator. Second cell site 224 has an operator different from the same operator of cell sites 214A and 214B. In other embodiments (not depicted), network environment 200 may contain more than one network 208 (e.g., a separate network for the second cell site 224), more than one database 210, more than two cell sites 214A and 224, and more than two serviceable areas 216A and 226.

In embodiments, UEs 202 and 204 may take on any variety of devices, such as a PC, a laptop computer, a tablet, a netbook, a mobile phone, a smart phone, a PDA, a wearable device, a fitness tracker, a server, a CD player, an MP3 player, a GPS device, a video player, a handheld communications device, a workstation, a router, an access point, or any other device capable of communicating using one or more resources of the network 208.

Further, UEs 202 and 204 may include components such as software and hardware, a processor, a memory, a display component, a power supply or power source, a speaker, a buffer, a touch-input component, a keyboard, a radio, and the like. For example, UEs 202 and 204 may include a transceiver for performing wireless communication between UEs 202 and 204 and other UEs (not depicted). The transceiver may include a dual-band transceiver configured for communicating over various frequency bands via one or more backhaul links (e.g. a wireless link or a wired link). Additionally, the transceiver may be configured for communicating with cell site 214A via one or more control links. In some embodiments, the transceiver may include at least one low-band transceiver (e.g. for communicating over one or more control links) and at least one high-band transceiver. In some embodiments, a transceiver may perform the functionality of a cellular transceiver (e.g., an LTE transceiver) or an mmWave transceiver (e.g., a WiGig or IEEE 802.11ad transceiver) for communication over an mmWave (e.g., a 60 GHz frequency band).

The transceiver may also comprise one or more antennas suitable for transmitting and/or receiving wireless communication signals, blocks, frames, transmission streams, packets, messages and/or data. For example, the one or more antennas may include any an arrangement of one or more antenna elements, components, units, assemblies and/or arrays that are suitable for directional communication (e.g., beamforming techniques). In embodiments, the one or more antennas may include a phased array antenna, a multiple element antenna, a set of switched beam antennas, etc. In some embodiments, the one or more antennas may implement transmit and receive functionalities using separate transmit and receive antenna elements. In some embodiments, the one or more antennas may implement transmit and receive functionalities using common and/or integrated transmit/receive elements.

Furthermore, the UEs 202 and 204 may comprise any mobile computing device that communicates by way of a wireless network (e.g., 4G, 5G, LTE, or any other type of OFDM based network). In embodiments, UE 204 may be capable of using 5G and having backward compatibility with prior access technologies. In some embodiments, UE 202 may be capable of using 5G but lacks backward compatibility with prior access technologies. In some embodiments, cell site 214A is in communication with other UEs that are legacy UEs not capable of using 5G.

In some cases, the UEs 202 and 204 in network environment 200 may optionally utilize network 208 to communicate with other user devices (e.g., a mobile device(s), a server(s), a PC, etc.) through cell sites 214A or 224. The network 208 may be a telecommunications network(s), or a portion thereof. Network 208 may comprise a 4G, 5G, or other next generation network. For example, the network 208 may comprise a 3GPP for 5G NR, a 5G NR non-standalone operating in 28 GHz, or a 5G NR standalone with microservices and service-based interfaces for end-to-end support. In some embodiments, network 208 may comprise a cloud-radio access network located in or associated with a cloud-computing environment having various cloud network components.

A telecommunications network might include an array of devices or components (e.g., one or more cell sites), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form to not obscure other aspects of the present disclosure. The network 208 may store information in the database 210. The database 210 can be any type of medium that is capable of storing information. The database 210 can be any collection of records. In one embodiment, the database 210 includes a set of embodied computer-executable instructions that, when executed, facilitate various aspects disclosed herein.

Turning to cell sites 214A, 214B, and 224, the terms "cell site" and "base station" may be used interchangeably herein to refer to a defined wireless communications serviceable area that is serviced by a base station. A first cell site 214A may provide wireless communication services to a first serviceable area 216A and a second cell site 224 may provide wireless communication services to a second serviceable area 226. Alternatively, the first cell site 214A may control multiple serviceable areas. In one aspect, the first cell site 214A serves at least one sector of serviceable area 216A associated with the cell site 214A. In other aspects, the first cell site 214A may comprise multiple transmit antennas for a plurality of cell sites, any one or more of which may serve at least a portion of the serviceable area 216A.

In particular, the first cell site 214A may be configured to wirelessly communicate with UEs 202 and 204 located within the serviceable area defined by a transmission range and/or receiving range of the radio antennas of the first cell site 214A. For example, the first cell site 214A transmits normal transmission 232 to UE 202 and normal transmission 234 to UE 204. In some embodiments, UE 204 is at or near the edge of serviceable area 216A. Further, it may be assumed that it is undesirable and unintended by the network 208 that the second cell site 224 provides wireless connectivity to UE 202, because UE 202 is geographically situated outside of the serviceable area 226.

In addition, the first cell site 214A and the second cell site 224 may be in communication with each other and with other cell sites (not depicted), any of which may be located in urban or rural serviceable areas 216A and 226. Furthermore, cell sites 214A and 224 may be in communication via a backhaul (not depicted). The backhaul may be wired or wireless and may comprise dark fiber for 5G communication services.

Cell sites 214A and 224 may include one or more carriers, band pass filters, radios, antennas, antenna arrays, power amplifiers, transmitters/receivers, digital signal processors, control electronics, GPS equipment, and the like. As discussed herein, cell sites 214A and 224 are deployed in the network 208 to control and facilitate, via one or more antenna arrays, the broadcast, transmission, synchronization, and receipt of one or more wireless signals in order to communicate with, verify, authenticate, and provide wireless communications service coverage to one or more UEs that request to join and/or are connected to a network.

In some aspects, the cell sites 214A and 224 may comprise one or more macro cells (providing wireless coverage for users within a large serviceable area). For example, macro cells may correspond to a coverage area having a radius of approximately 1-15 miles or more, the radius measured at ground level and extending outward from an antenna at the cell site. In some aspects, cell sites 214A and 224 may comprise, or be in communication with, one or more small cells (providing wireless coverage for users within a small geographic area). For example, a small cell may correspond to a coverage area having a radius of approximately less than three miles, the radius measured at ground level and extending outward from an antenna at the cell site. In embodiments, cell site 214A or cell site 224 is in communication with a plurality of in-door small cells. In some embodiments, the network environment 200 includes a heterogeneous network having both the one or more small cells and the one or more macro cells.

Furthermore, the one or more small cells may support mmWaves via mmWave nodes corresponding to an antenna. Additionally, the one or more small cells may combine a plurality of 100 MHz channels. Continuing the example, the one or more small cells may also combine radio and antenna elements. Further, the one or more small cells may each have an Ethernet cable backhaul. Additionally, the one or more small cells may have the capability of transferring data to multiple user devices during a single point in time via a plurality of antennas (e.g. via a multi-user MIMO antenna system).

In network environment 200, cell sites 214A and 224 are not co-located. In some embodiments, cell site 214A and/or another device (e.g., a UE, an access point, or another radio frequency device) may determine that cell sites 214A and 224 are not co-located. This determination may be made based on transceiver specifications and antenna configurations of both cell sites 214A and 224. The transceiver specifications and antenna configurations may be based in part on a type of co-location (e.g., Pico GSM900). Further, co-location may depend upon compliance of cell sites 214A and 224 with a first set of test requirements for spurious emissions (e.g., frequency ranges for co-existence and/or a maximum power level), and/or compliance with a second set of test requirements for receiver blocking. In some embodiments, co-location may depend upon signal filtration information. For example, cell sites 214A and 224 may have knowledge-based filtration implemented for particular bandwidths. Continuing the example, cell site 214A may employ or be in communication with another device utilizing a tunable notch filter. In some embodiments, cell sites 214A and 224 may have passive filters implemented. For example, a passive filter may include a frequency agile band pass filter.

Additionally, co-location may also depend upon time slotting/sharing. For example, normal transmission signal 232 may have particular time slotting with another normal transmission (not depicted) from cell site 214A to prevent interference between normal transmission 232 and the other normal transmission (not depicted). Continuing the example, normal transmission 234 may not have a similar time slotting scheme in place to prevent interferences from cell sites adjacent to cell site 214A. Further, in some embodiments, co-location may include specific requirements that protect specific equipment (e.g. the UEs or the base station) and/or specific requirements that protect specific systems (e.g., CDMA, GSM, UTRA, E-UTRA, and so forth). In addition, another specific requirement for co-location may include power limits (e.g., as defined in 3GPP 36.104).

With respect to interference zone 240, interference zone 240 occurs within the serviceable area 216A based on the interference 236 from cell site 224. In some embodiments, interference 236 comprises a distortion signal or a jammer signal that interferes with the UE 204 and the normal transmission 234. In some embodiments, cell site 214A determines that the normal transmission 234, having a first bandwidth, has at least one interference measurement above a threshold. The interference measurement may be based on a portion of the first bandwidth being blanked such that the UE 204 receives data on a second bandwidth that is a smaller bandwidth than the first bandwidth. Additionally, the interference measurement may be determined using information received from UE 204 and/or cell site 224. In some embodiments, the determination that the interference measurement is above the threshold is based on UE 204 being located in the interference zone 240. For example, the location of UE 204 may be determined using GPS or other satellite location services, terrestrial triangulation, an access point location, and/or any other means of obtaining coarse or fine location information. Furthermore, the threshold may be determined based on the UE location information and/or location information of cell sites 214A and 224. For example, the threshold may be determined based on a distance between the cell site 214A and the cell site 224.

Further, determining that the first bandwidth has the at least one interference measurement above the threshold may comprise receiving, from UE 204, a detected signal level of a resource block within a range of the UE. For example, the detected signal level of the resource block may be associated with subcarrier spacing. Continuing the example, the resource block may span 12 subcarriers and may have 15 kHz subcarrier spacing with respect to 180 kHz. In addition, the detected signal level of the resource block may be associated with a total transmit power for a single resource block allocation in order for a full physical resource block allocation (e.g., a 20 MHz LTE carrier supporting 100 physical resource blocks may have a total power dynamic range of 20 dB and supportable power difference between resource elements of 6 dB).

In some embodiments, a plurality of interference measurements may be used for determining the at least one interference measurement above the threshold. Cell site 214A may receive the plurality of interference measurements from UEs 202, 204, and other UEs (not depicted). In some embodiments, cell site 214A may receive the plurality of interference measurements from only UE 204. In some embodiments, cell site 214A may receive the plurality of interference measurements from UE 204 and from cell site 224 (e.g., cell site 224 communicating to cell site 214A based on information received from UEs located within interference zone 240 and in communication with cell site 224).

Based on the interference (and in some embodiments, based upon determining that the cell site 224 is not co-located with cell site 214A), cell site 214A modifies a downlink configuration of UE 204. For example, cell site 214A modifies the downlink configuration from the first bandwidth of the normal transmission 234 to a third bandwidth, wherein the third bandwidth is a smaller bandwidth than the second bandwidth. Modification of the downlink configuration to the second bandwidth improves the normal transmission 234 between cell site 214A and UE 204, and reduces and/or ameliorates interference from interference 236. In some embodiments, for example, the first bandwidth is 10 MHz and the third bandwidth is 5 MHz. In some embodiments, downlink configurations of a plurality of UEs (not depicted) within the interference zone 240 are switched to the third bandwidth.

Figure 3:
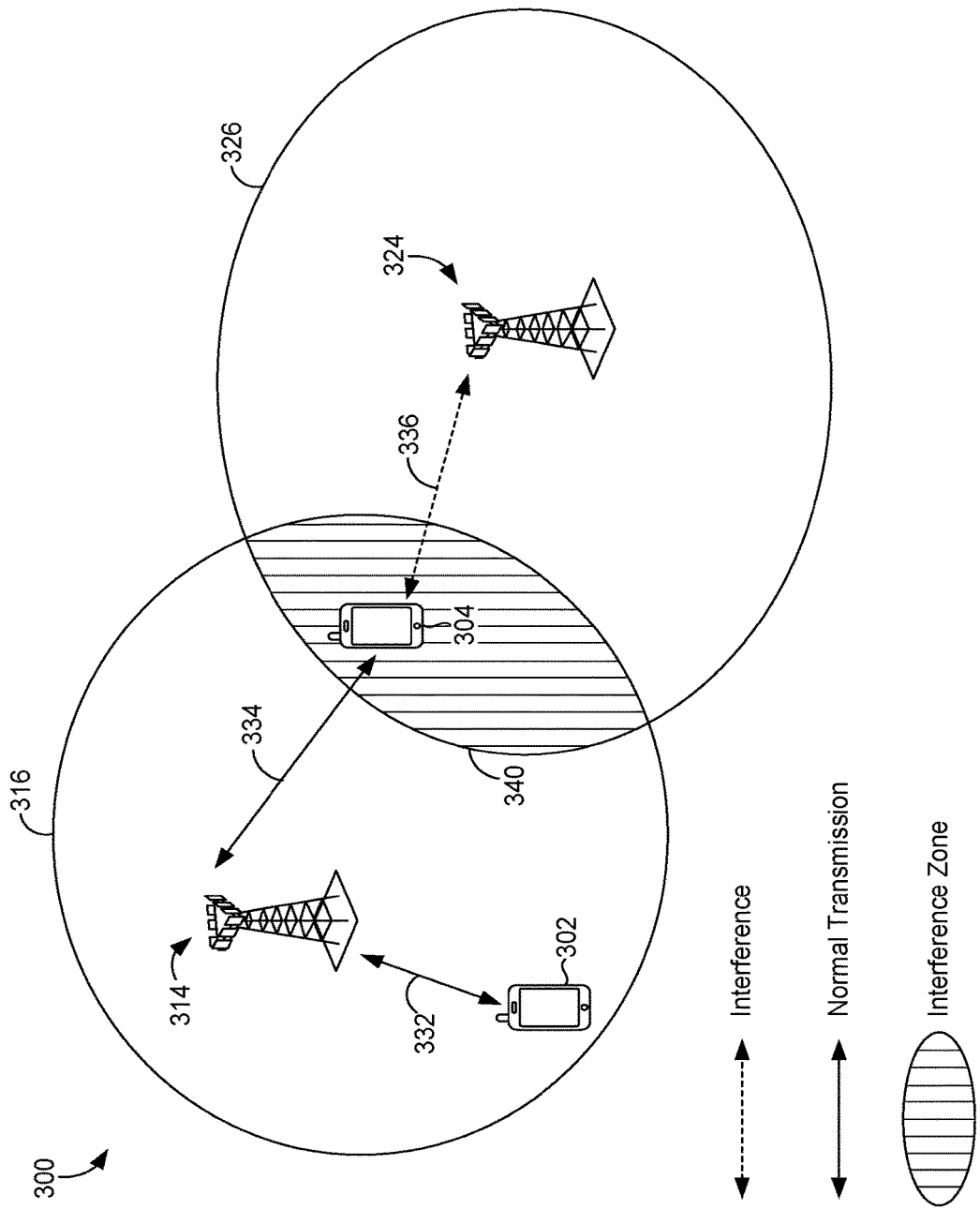
FIG. 3 depicts an example network environment suitable for use in implementations of the present disclosure.

Turning now to FIG. 3, network environment 300 comprises UE 302, UE 304, cell site 314, cell site 324, serviceable area 316, serviceable area 326, normal transmissions 332 and 334, interference 336, and interference zone 340. In environment 300, cell sites 314 and 324 are not co-located. Further, UE 302 is in communication with cell site 314 via normal transmission 332 and UE 304 is in communication with cell site 314 via normal transmission 334, which utilizes a first bandwidth, which has a portion that is blanked such that the UE 304 receives data on a second bandwidth that is a smaller bandwidth than the first bandwidth. Interference 336 affects the transceiver of UE 304 and its ability to receive normal transmission 334. In some embodiments, interference 336 is associated with a 4G network or a 5G network. In some embodiments, interference zone 340 is based on cell edge interference from overlapping signals between cell sites 314 and 324. Additionally, an average tower density may contribute to interference within interference zone 340.

For example, serviceable area 316 may have a different tower density within the interference zone 340 than the tower density of serviceable area 326. As such, the cell site 314 determines that UE 304 has at least one interference measurement above a threshold based on a tower density with respect to serviceable area 316 and/or serviceable area 326. Further, in some embodiments, interference zone 340 comprises interference associated with common phase error. Continuing the example, determining the at least one interference measurement is above the threshold includes receiving information from UE 304, the information including video quality and call quality resulting from common phase error. In some embodiments, the at least one interference measurement is associated with RF spillover from at least one of the cell sites 314 and 324. Cell site 314 may also receive interference measurements from UE 302 for baseline determinations with respect to the threshold.

Accordingly, upon determining that the at least one interference measurement is above the threshold, cell site 314 dynamically switches the downlink configuration of UE 304 to a third bandwidth, wherein the third bandwidth is a smaller bandwidth than the second bandwidth. In some embodiments, the at least one interference measurement is based on the cell sites 314 and 324 not being co-located. In some embodiments, UE 304 receives a plurality of interference measurements that are also above the threshold. In response to the plurality of interference measurements being above the threshold, cell site 314 modifies the downlink configuration of UE 302 to the third bandwidth. In some embodiments, the plurality of interference measurements correspond to the cell site 324 and distortion. In some embodiments, the plurality of interference measurements correspond with a bandwidth of interference 336 that is wider than the first bandwidth corresponding to the normal transmission 334.

Figure 4:
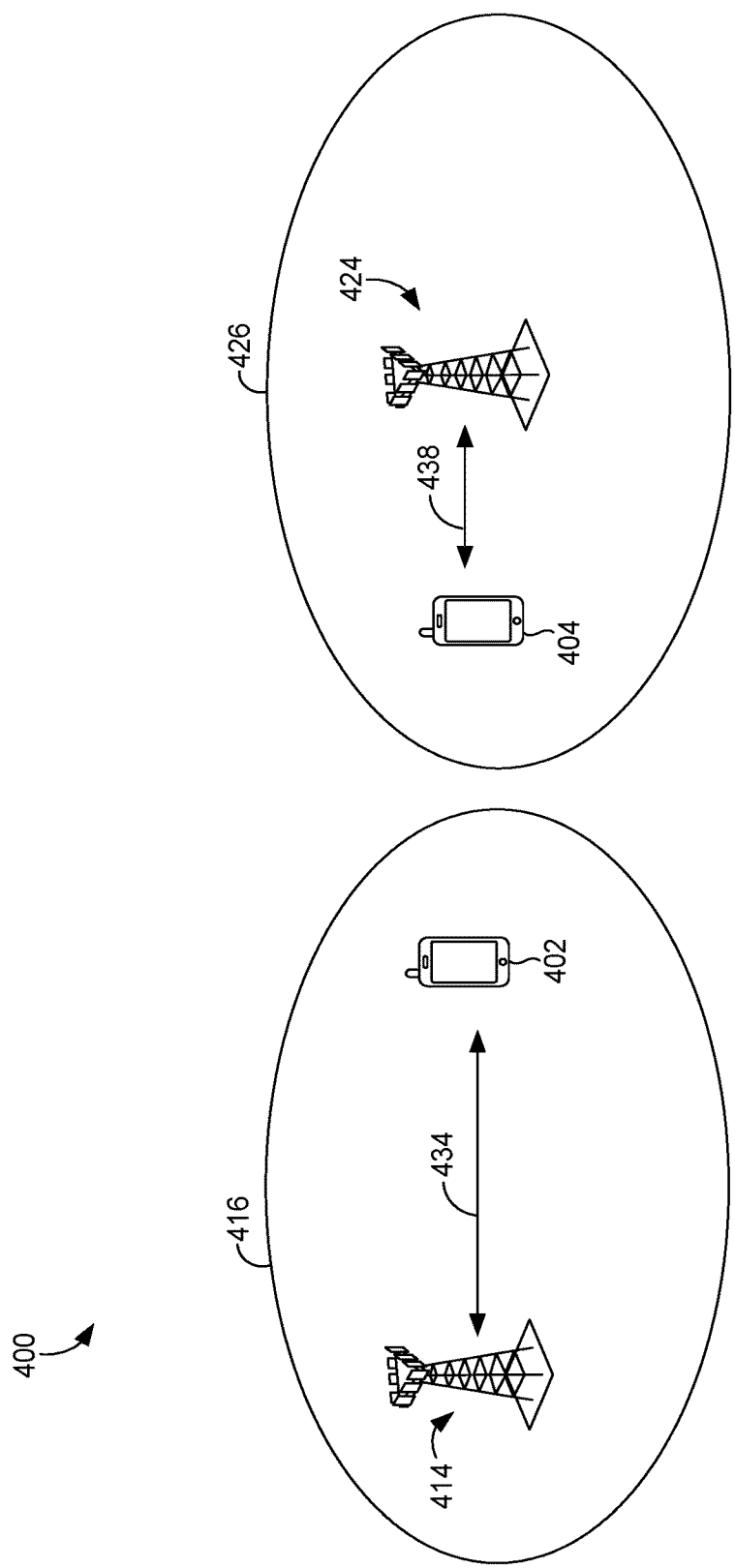
FIG. 4 depicts an example network environment suitable for use in implementations of the present disclosure.

Turning now to FIG. 4, network environment 400 comprises UEs 402 and 404, cell site 414 that has serviceable area 416, cell site 424 that has serviceable area 426, and normal transmissions 434 and 438. In network environment 400, cell sites 414 and 424 are co-located. For example, cell sites 414 and 424 are both compliant with a first set of test requirements for spurious emissions. Additionally, cell sites 414 and 424 may also be complaint with a second set of test requirements for receiver blocking. In some embodiments, cell site 414 determines that cell site 424 is co-located based on serviceable area 416 not overlapping serviceable area 426. In some embodiments, cell site 414 determines cell site 424 is co-located based on an adjacent-channel interference measurement, a co-channel interference measurement, a distortion measurement, a capture effect measurement, and/or a dynamic range limitation measurement being below a threshold.

Normal transmission 434 comprises a first bandwidth that has a portion blanked such that the UE 402 receives data on a second bandwidth that is a smaller bandwidth than the first bandwidth. Upon determining that is the first bandwidth has an interference measurement above a threshold, cell site 414 modifies the downlink configuration of UE 402 from a first bandwidth to a third bandwidth, wherein the third bandwidth is a smaller bandwidth than the second bandwidth. In some embodiments, upon determining a bandwidth of transmission 438 has an interference measurement above a threshold, cell site 424 modifies the downlink configuration of UE 404 to a smaller bandwidth. For example, cell site 424 may modify the downlink configuration from 10 MHz to 5 MHz. Further, the interference may result from the 10 MHz bandwidth having resource block blanking.

Figure 5:
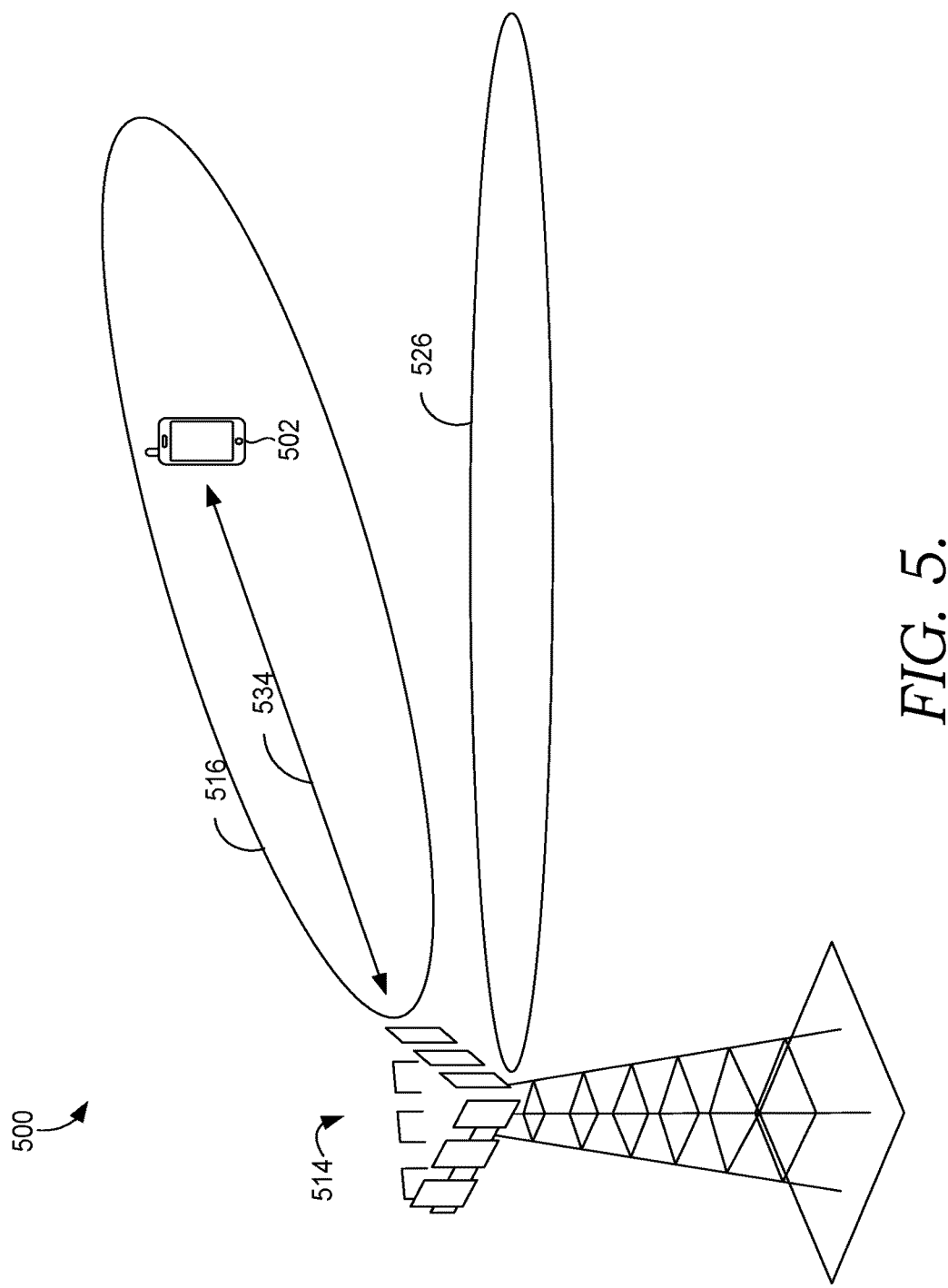
FIG. 5 depicts an example network environment suitable for use in implementations of the present disclosure.

Turning to FIG. 5, network environment 500 comprises UE 502, cell site 514, serviceable areas 516 and 526, and normal transmission 534. Two separate operators provide serviceable areas 516 and 526, and serviceable areas 516 and 526 are co-located. For example, different antennas may provide serviceable areas 516 and 526, each of the different antennas from a different antenna array. Continuing the example, serviceable areas 516 and 526 may have transceiver specifications and/or antenna configurations that reduce or eliminate interference between serviceable areas 516 and 526. Further, serviceable areas 516 and 526 may comply with a first set of test requirements for spurious emissions and/or a second set of test requirements for receiver blocking. In some embodiments, signal filters may be implemented at cell site 514 to facilitate co-location between serviceable areas 516 and 526.

Additionally, co-location between serviceable areas 516 and 526 may depend upon time slotting. In some embodiments, cell site 514 transmits 64 signals from an antenna array, the signals incurring different delays and phase-shifts while traveling through different physical paths (i.e., RF chains). Due to these delays and phase-shifts, cell site 514 may have time and phase alignments at the antenna array that provide for co-location of the serviceable areas 516 and 526. The time and phase alignments mitigate or alleviate relative phase errors among the 64 signals. In some embodiments, the time and phase alignments result in serviceable area 516 having a very sharp and accurate antenna beam to a targeted area that delivers a powerful stream of coverage to UE 502 and other UEs (not depicted) within serviceable area 516.

In some embodiments, normal transmission 534 corresponds to a first bandwidth. Continuing the example, the first bandwidth comprises a portion of the first bandwidth that is blanked such that the user device receives data on a second bandwidth that is a smaller bandwidth than the first bandwidth. Based upon determining that the serviceable area 516 has at least one interference measurement above a threshold, the downlink configuration of the UE 502 is modified to a third bandwidth that is a smaller bandwidth than the second bandwidth. Further, in some embodiments, the first bandwidth is 10 MHz, the second bandwidth is 6 MHz, and the third bandwidth is 4 MHz.

Furthermore, in some embodiments, the operator providing telecommunication services to serviceable area 516 will use a bandwidth for normal transmission 534 that does not conform to a the particular licensing scheme. Accordingly, upon use of the nonconforming bandwidth, UE 502 may experience interference from serviceable area 526. Upon determining that UE 502 is experiencing this interference and/or upon determining that serviceable areas 516 and 526 are no longer co-located, cell site 514 may switch a downlink configuration of UE 502 to a smaller bandwidth to avoid or mitigate the interference.

Figure 6:
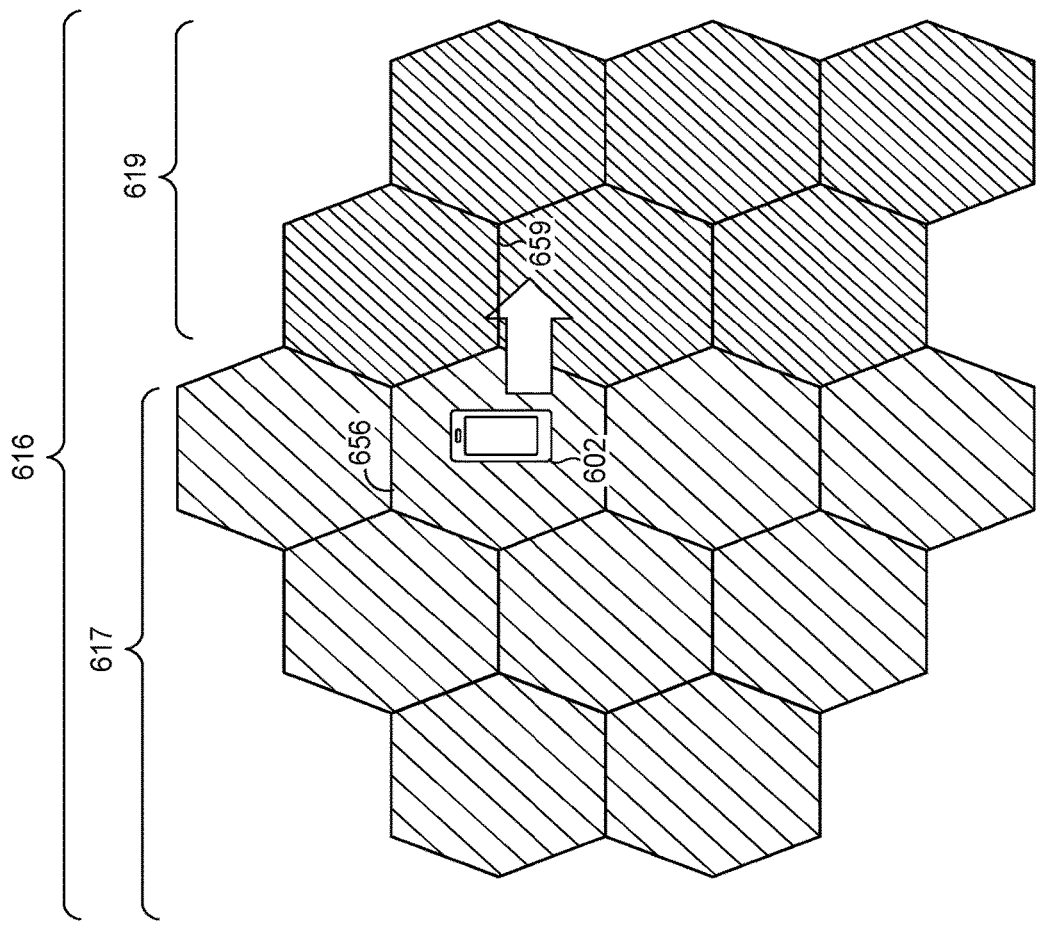
FIG. 6 depicts an example user device handover environment, in accordance with aspects of the present disclosure.

Turning now to FIG. 6, handover environment 600 comprises UE 602 located within serviceable area 616. Serviceable area 616 comprises carriers 617 operating on a wider frequency and carriers 619 operating on a smaller frequency. Due to the operation on the wider frequency and resource block blanking, carrier 656 may experience interference. For example, carriers 617 may provide a 10 MHz downlink frequency with 3 MHz resource block blanking and carriers 619 may provide a 5 MHz downlink frequency. Upon a determination that UE 602, located at carrier 656 that is providing the 10 MHz downlink frequency, is experiencing interference and upon another determination that an adjacent base station is not co-located, the downlink configuration of UE 602 is modified to a smaller bandwidth to avoid or mitigate the interference. For example, UE 602 experiences handover from carrier 656 to carrier 659.

Stated differently, carriers 617 within the serviceable area 616 (e.g., of the first cell site 214A of FIG. 2) are configured with a first bandwidth 10 MHz and resource block blanking. For example, a portion of the first bandwidth 10 MHz is blanked such that the user device 602 receives data on a second bandwidth (e.g. 7 MHz). Continuing the example, a second plurality of carriers 619 are also within the serviceable area 616 and are configured with a third bandwidth (e.g., 5 MHz). Accordingly, upon UE 602 (or a cell site) determining at least one interference measurement is above a threshold, the downlink configuration of the user device is modified from carrier 656 to one of the second plurality of carriers 659.

Figure 7:
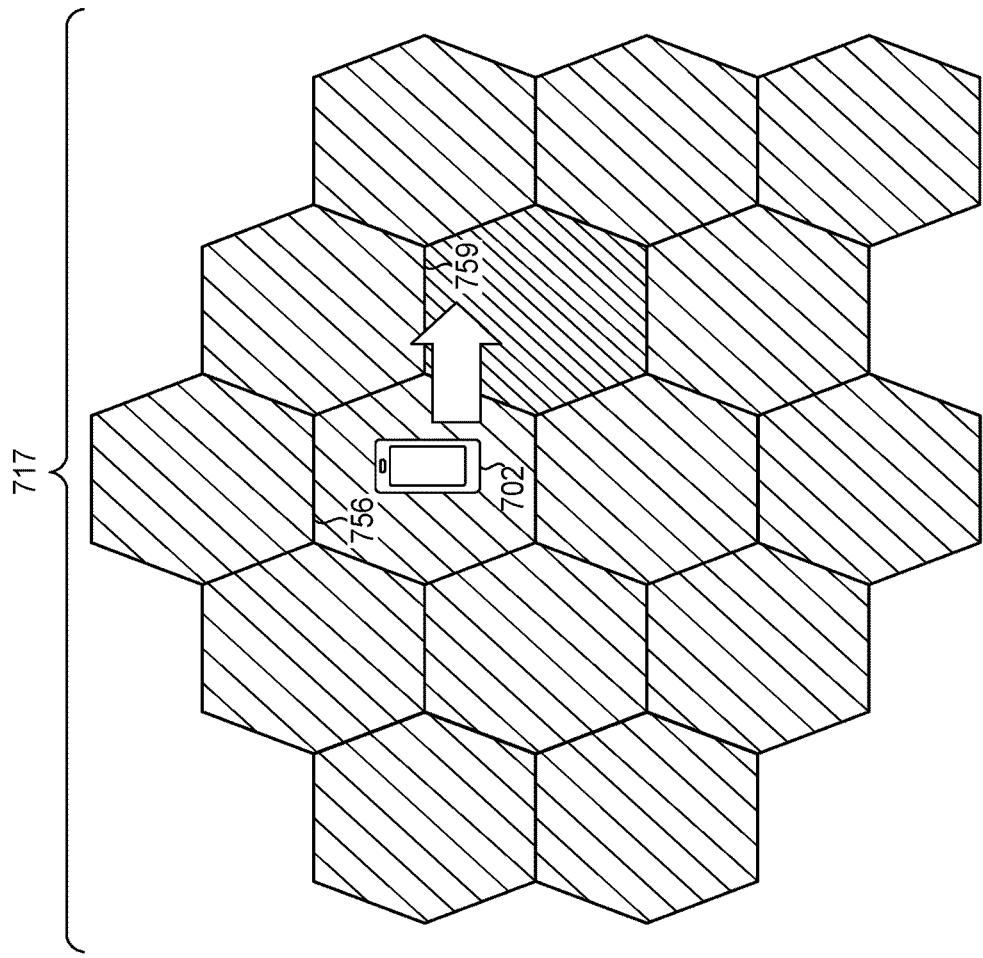
FIG. 7 depicts an example user device handover environment, in accordance with aspects of the present disclosure.

Turning now to FIG. 7, handover environment 700 comprises UE 702 located within a serviceable area comprising carriers 717, wherein all but one of carriers 717 are providing telecommunication services at a wider frequency than carrier 759, which is using a smaller frequency. Due to the operation on the wider frequency, the carriers using the wider frequency utilize resource block blanking. For example, the carriers at the wider frequency may provide a 10 MHz downlink frequency with 4 MHz resource block blanking, and carrier 759 may provide a 5 MHz downlink frequency. Upon a determination that UE 702, located at carrier 756 that is providing the 10 MHz downlink frequency, is experiencing interference and upon another determination that an adjacent base station is not co-located, the downlink configuration of UE 702 is dynamically modified to a smaller bandwidth to avoid or mitigate the interference. For example, UE 702 experiences handover from carrier 756 to carrier 759.

Figure 8:
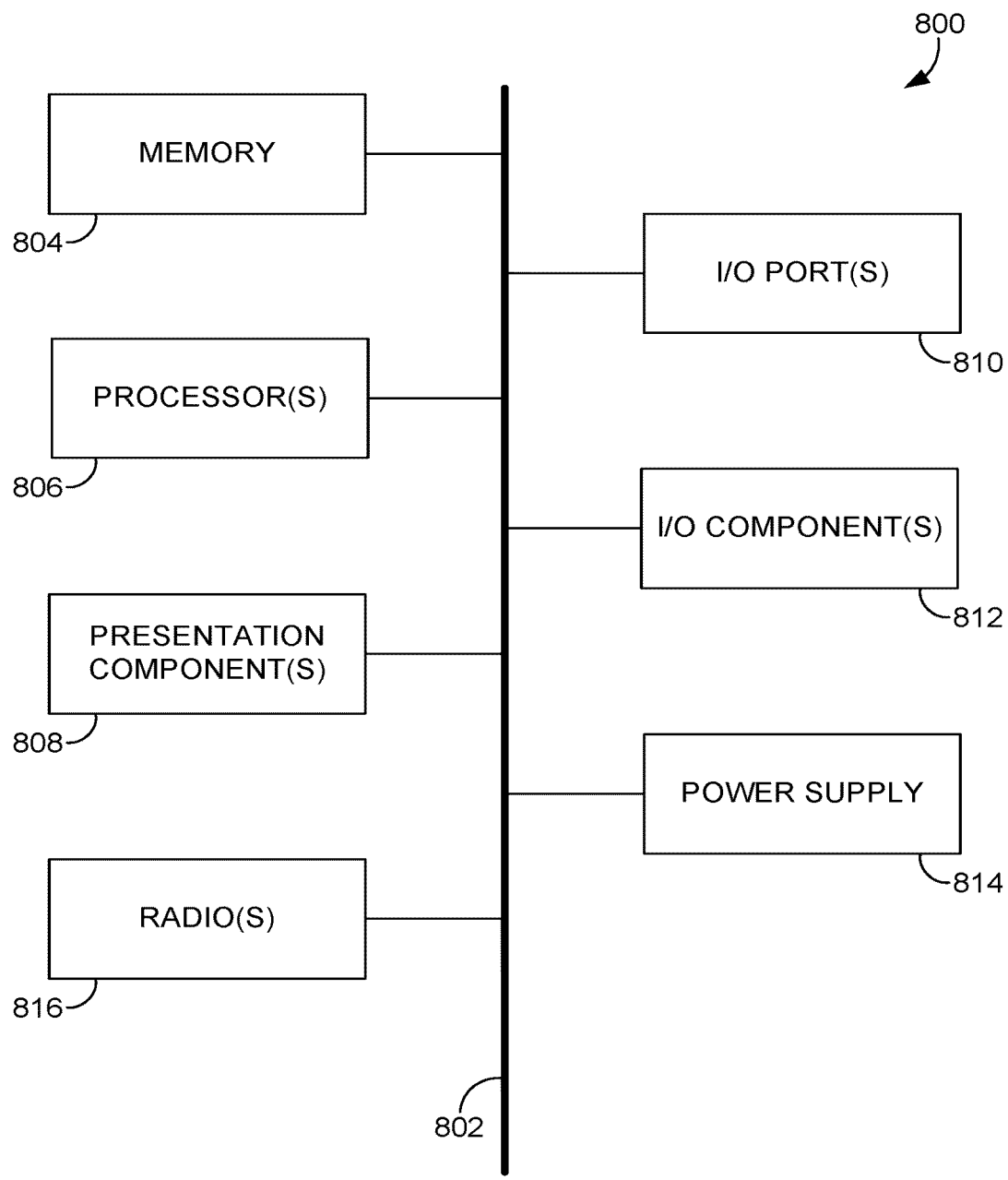
FIG. 8 depicts a diagram of an exemplary computing environment suitable for use in implementations of the present disclosure.

Turning now to FIG. 8, a diagram is depicted of an exemplary computing environment suitable for use in implementations of the present disclosure. In particular, the exemplary computer environment is shown and designated generally as UE/user device 800. User device 800 is but one example of a suitable computing environment and is not intended to suggest any limitation as to the scope of use or functionality of the invention. Neither should user device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, user device 800 includes bus 802 that directly or indirectly couples the following devices: memory 804, one or more processors 806, one or more presentation components 808, input/output (I/O) port(s) 810, I/O component(s) 812, power supply 814, and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O component(s) 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "user device."

User device 800 typically includes a variety of computer-readable media. Computer-readable media can be any available media that can be accessed by user device 800. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 804, memory 804 includes computer-storage media in the form of volatile and/or nonvolatile memory. Memory 804 may be removable, nonremovable, or a combination thereof. Examples of memory 804 include solid-state memory, hard drives, optical-disc drives, etc. For instance, memory 804 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 806, the one or more processors 806 read data from various entities such as bus 802, memory 804 or I/O component(s) 812. The one or more processors 806 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 806 execute instructions, for example, of an Operating System of the user device 800 and/or of one or more suitable applications.

Further, the one or more presentation components 808 present data indications to a person or other device. Examples of one or more presentation components 808 include a display device, speaker, printing component, vibrating component, etc. Additionally, I/O port(s) 810 allow user device 800 to be logically coupled to other devices including I/O component(s) 812, some of which may be built in user device 800. Illustrative I/O component(s) 812 include a microphone, joystick, game pad, satellite dish, scanner, printer, wireless device, etc. Furthermore, power supply 814 may include any suitable source of power, such as a rechargeable lithium polymer battery and/or an alternating current power converter.

Turning to radio 816, the radio 816 facilitates communication with a wireless telecommunications network. For example, radio 816 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 816 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, and/or 802.11 protocols and techniques, etc.

Illustrative wireless telecommunications technologies that radio 816 may facilitate include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies.

Figure 9:
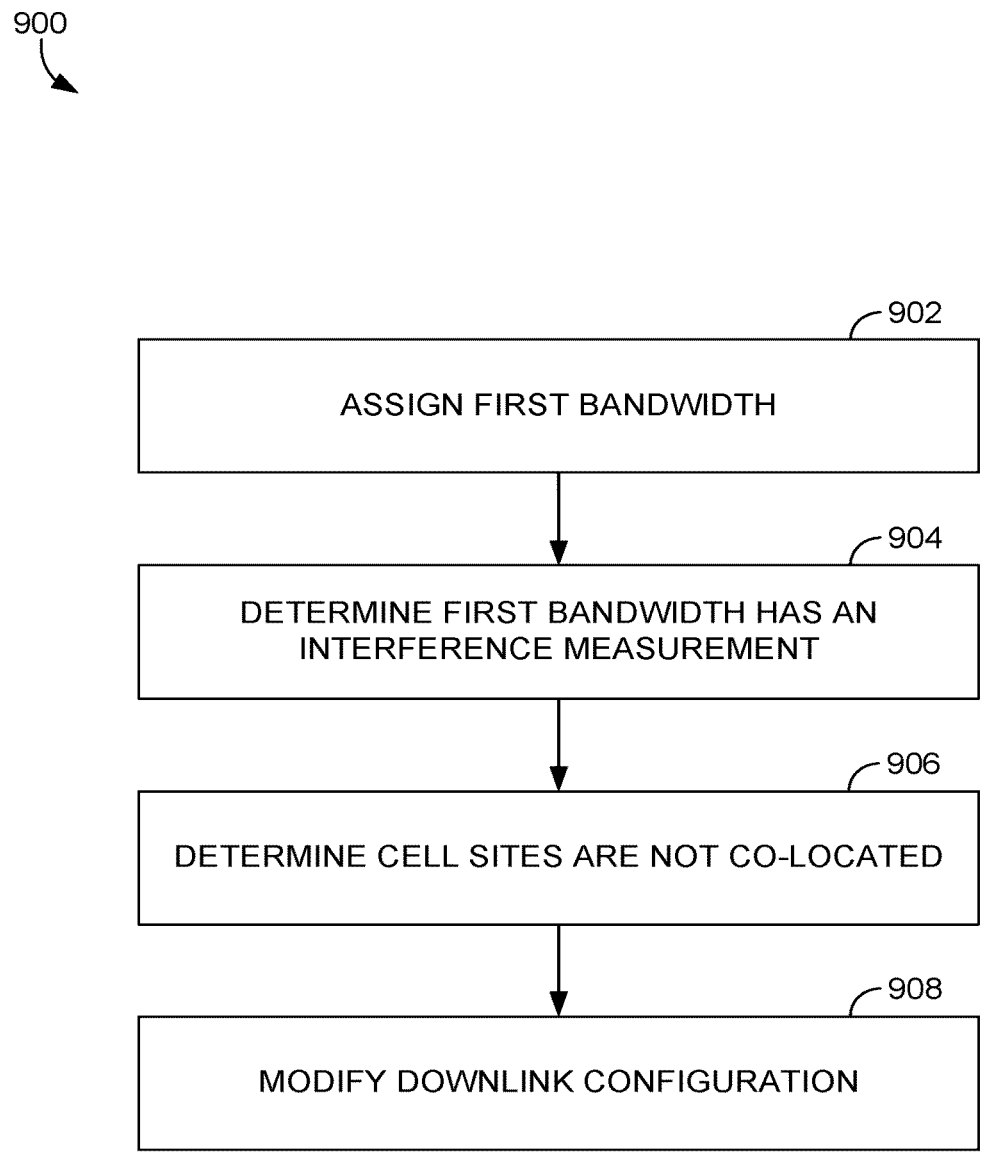
FIG. 9 depicts a flow diagram of an example method for dynamically modifying a downlink configuration of a user device to mitigate interference.

Turning now to FIG. 9, method 900 is depicted for the modification of a downlink configuration of a user device in a cell to mitigate interference. At block 902, a first cell site assigns a first bandwidth to the user device within a serviceable area of the first cell site. A portion of the first bandwidth is blanked such that the user device receives data on a second bandwidth that is a smaller bandwidth than the first bandwidth. In embodiments, the first cell site has one or more nodes, each of the one or more nodes configured to wirelessly communicate with the user device in the serviceable area. In some embodiments, a plurality of user devices are located within the serviceable area. In some embodiments, the first bandwidth is 10 MHz.

At block 904, it is determined that the first bandwidth within the serviceable area of the first cell site has at least one interference measurement above a threshold. In some embodiments, the threshold may be based on a distance between the first cell site and the second cell site. In embodiments, the at least one interference measurement corresponds to interference from the second cell site. In some embodiments, a plurality of interference measurements received from a plurality of user devices located within the serviceable area are determined to be above the threshold. Determining the at least one interference measurement is above a threshold may comprise receiving, from the user device, a signal level of a resource block within a range of the user device.

Additionally, this determination may be based on signal information received from both the user device and from the second cell site. The signal information may comprise a power level of a transmission corresponding to the second cell site and a number of frequency allocations available to the second cell site. The second cell site may be a small cell and the signal information from the small cell may comprise a radio footprint of the small cell. The signal information may also comprise a transmission power of the user device. In some embodiments, the at least one interference measurement is based on interference from a second cell site that is not co-located with the serviceable area of the first cell site.

At block 906, it is determined whether a second cell site is co-located with the first cell site. In some embodiments, the second cell site is co-located with the first cell site. In some embodiments, the second cell site is not co-located with the first cell site. In some embodiments, determining that the second cell site is not co-located with the serviceable area of the first cell site is based on a second serviceable area of the second cell site not being compliant with a first set of test requirements for spurious emissions. Further, determining that the second serviceable area is not co-located with the serviceable area further comprises determining that the second serviceable area is not and complaint a second set of test requirements for receiver blocking. In some embodiments, determining that the second cell site is co-located with the first cell site comprises determining that a second serviceable area of the second cell site does not overlap the serviceable area of the first cell site.

At block 908, the downlink configuration of the user device is modified. Upon determining that the first bandwidth has the at least one interference measurement above the threshold, the downlink configuration is modified to a third bandwidth that is a smaller bandwidth than the second bandwidth. In some embodiments, the first bandwidth is 10 MHz, the second bandwidth is 7 MHz, and the third bandwidth is 5 MHz. In some embodiments, there are a plurality of carriers within the serviceable area of the first cell site that are configured with the first bandwidth and resource block blanking. Continuing the example, a second plurality of carriers are also located within the serviceable area and are configured with the third bandwidth. As such, the downlink configuration of the user device may be configured from one of the plurality of carriers to one of the second plurality of carriers.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for modifying a downlink configuration of a user device in a cell to mitigate interference, the method comprising:
   assigning, via a first cell site, a first bandwidth to the user device within a serviceable area of the first cell site, wherein a portion of the first bandwidth is blanked such that the user device receives data on a second bandwidth that is a smaller bandwidth than the first bandwidth;
   determining that the first bandwidth within the serviceable area of the first cell site has at least one interference measurement above a threshold;
   determining that a second cell site is not co-located with the serviceable area of the first cell site based on a second serviceable area of the second cell site; and
   upon determining that the first bandwidth has the at least one interference measurement above the threshold and that the second cell site is not co-located with the serviceable area of the first cell site, modifying the downlink configuration of the user device to a third bandwidth that is a smaller bandwidth than the second bandwidth.

2. The method of claim 1, wherein the second cell site is not co-located with the serviceable area based on a time slotting scheme associated with the first cell site and the serviceable area.

3. The method of claim 1, wherein the first bandwidth is 10 MHz and the third bandwidth is 5 MHz.

4. The method of claim 1, wherein the second cell site is not co-located with the serviceable area based on a distortion measurement and a dynamic range limitation measurement being below a threshold.

5. The method of claim 4, wherein the second cell site is not co-located with the serviceable area based on a set of test requirements for receiver blocking.

6. The method of claim 1, further comprising modifying the downlink configuration of the user device from a first carrier associated with the first bandwidth to one of a second plurality of carriers associated with the third bandwidth based on determining that the first bandwidth has the at least one interference measurement above the threshold and that the second cell site is not co-located with the serviceable area of the first cell site.

7. The method of claim 1, wherein determining that the first bandwidth within the serviceable area of the first cell site has the at least one interference measurement above the threshold comprises receiving, from user device, a detected signal level associated with a total transmit power and the second bandwidth.

8. The method of claim 1, wherein determining that the first bandwidth within the serviceable area of the first cell site has the at least one interference measurement above the threshold is based on a total transmit power corresponding to the portion of the first bandwidth that is blanked.

9. A system for modifying a downlink configuration of a user device in a cell to mitigate interference, the system comprising:
   a first cell site having one or more nodes, each of the one or more nodes configured to wirelessly communicate with the user device in a serviceable area; and
   one or more processors in communication with the first cell site and configured to perform operations comprising:
      assigning, via the first cell site, a first bandwidth to the user device within the serviceable area, wherein a portion of the first bandwidth is blanked such that the user device receives data on a second bandwidth that is a smaller bandwidth than the first bandwidth;
      determining that the serviceable area has at least one interference measurement above a threshold based on signal information received from the user device, the at least one interference measurement corresponding to a second cell site; and
      based on determining the interference measurement is above the threshold, modifying the downlink configuration of the user device to a third bandwidth that is a smaller bandwidth than the second bandwidth.

10. The system of claim 9, wherein the threshold is determined based on a location of the user device relative to the first cell site.

11. The system of claim 9, wherein the signal information received from the user device, for determining that the serviceable area has the at least one interference measurement above the threshold, includes a detected signal level of a resource block associated with subcarrier spacing corresponding to the second bandwidth.

12. The system of claim 9, wherein the operations further comprise:
   determining a plurality of interference measurements received from a plurality of user devices located within the serviceable area are above the threshold; and
   in response to the plurality of interference measurements being above the threshold, modifying the downlink configuration of the plurality of user devices to the third bandwidth.

13. The system of claim 9, wherein determining that the at least one interference measurement is above the threshold is based on signal information received from the second cell site.

14. The system of claim 9, wherein the signal information comprises a power level of a transmission corresponding to the second cell site.

15. The system of claim 9, wherein the signal information comprises a transmission power of the user device.

16. The system of claim 9, wherein the signal information comprises a radio footprint of the second cell site.

17. One or more non-transitory computer-readable media having computer-executable instructions embodied thereon that, when executed, perform a method for modifying a downlink configuration of a user device in a cell to mitigate interference, the method comprising:
   assigning, via a first cell site, a first bandwidth to the user device within a serviceable area, wherein a portion of the first bandwidth is blanked such that the user device receives data on a second bandwidth that is a smaller bandwidth than the first bandwidth, such that the blanking for the user device to receive the data on the second bandwidth is based at least in part on a dynamic range limitation corresponding to a location of the user device and a location of the first cell site;
   determining that the serviceable area has at least one interference measurement above a threshold, the at least one interference measurement corresponding to a second cell site; and
   upon determining that the at least one interference measurement is above the threshold, modifying the downlink configuration of the user device to a third bandwidth that is a smaller bandwidth than the second bandwidth.

18. The media of claim 17, further comprising dynamically modifying the downlink configuration of the user device from a first carrier of a first plurality of carriers associated with the second bandwidth to a second carrier of a second plurality of carriers associated with the third bandwidth.

19. The media of claim 17, wherein a first plurality of carriers within the serviceable area of the first cell site are configured with the first bandwidth and resource block blanking.

20. The media of claim 17, wherein the threshold is determined based on a tower density corresponding to the first cell site.

* * * * *